United States Patent [19]
Kamo

[11] Patent Number: 6,011,651
[45] Date of Patent: Jan. 4, 2000

[54] PHOTOGRAPHIC OPTICAL SYSTEM USING DIFFRACTIVE OPTICAL ELEMENT

[75] Inventor: Yuji Kamo, Hino, Japan

[73] Assignee: Olympus Optical Co., Ltd., Tokyo, Japan

[21] Appl. No.: 08/934,894

[22] Filed: Sep. 22, 1997

[30] Foreign Application Priority Data

Sep. 26, 1996 [JP] Japan .................................. 8-254586

[51] Int. Cl.⁷ ...................................................... G02B 5/18
[52] U.S. Cl. ............................................ 359/575; 359/558
[58] Field of Search ...................................... 399/558, 575

[56] References Cited

U.S. PATENT DOCUMENTS 5,493,143   2/1996   Hokari .................................. 257/432

FOREIGN PATENT DOCUMENTS

| 6-194571 | 7/1994 | Japan . |
| 6-324262 | 11/1994 | Japan . |
| 8-43767 | 2/1996 | Japan . |
| 95-18393 | 7/1995 | WIPO . |

*Primary Examiner*—Cassandra Spyrou
*Assistant Examiner*—Jennifer Winstedt
*Attorney, Agent, or Firm*—Pillsbury Madison & Sutro LLP

[57] ABSTRACT

A photographic optical system using a DOE in which color flare is inconspicuous. The photographic optical system has at least one diffractive optical element. Assuming that a wavelength at which the diffraction efficiency of the diffractive optical element reaches a maximum is defined as a design wavelength $\lambda_{DOE}$, it satisfies the following condition:

$$0 < E_1(\lambda_{DOE}) + E_3(\lambda_{DOE}) < 0.2$$

where $E_1(\lambda_{DOE})$ is the amount of color flare received by a blue photosensitive layer or a blue light-receiving element, and $E_3(\lambda_{DOE})$ is the amount of color flare received by a red photosensitive layer or a red light-receiving element.

7 Claims, 13 Drawing Sheets

PHOTOGRAPHIC OPTICAL SYSTEM USING DIFFRACTIVE OPTICAL ELEMENT

BACKGROUND OF THE INVENTION

1. Field of the Invention

The present invention relates to a photographic optical system using a diffractive optical element (hereinafter referred to as "DOE"), which is applicable to photographic optical systems used in a relatively wide wavelength range, for example, silver halide cameras and electronic cameras. More particularly, the present invention is suitable for use as a photographic optical system adapted for color images formed by development of three or more colors.

2. Description of Related Art

Silver halide cameras, electronic cameras, etc., that are compact and lightweight are favorable for portable use. Accordingly, a large number of schemes for achieving compact photographic optical systems have heretofore been proposed. General photographic optical systems used in cameras, etc. are formed from a refracting system that bends light rays by a refracting action. However, refracting lenses have a radius of curvature to ensure a focal length and to correct aberrations. Therefore, the conventional practice is to increase the thickness of each lens in order to ensure the thickness of the edge thereof and to increase the axial distance between adjacent lenses in order to avoid an interference therebetween. Moreover, because aberration correction is made by combining together positive and negative lenses, the number of constituent lens elements undesirably increases. Accordingly, it has heretofore been difficult to reduce the size of a refracting system to a considerable extent.

In recent years, aspherical surfaces are used to reduce the number of lens elements to thereby attain a reduction in the size of refracting systems. However, aspherical surfaces cannot correct chromatic aberrations, although they can correct monochromatic aberrations, e.g. spherical aberrations and comatic aberrations. Therefore, if the number of lens elements is reduced to a considerable extent, chromatic aberrations are aggravated. Accordingly, there is a limit in achieving a compact refracting system while ensuring the required performance.

Meanwhile, attention has recently been given to diffractive optical elements (DOEs) that bend light rays by a diffracting action. Unlike refracting systems, DOEs have the advantage that the power thereof is independent of the radius of curvature; therefore, a deviation surface can be formed as a flat surface, for example. Moreover, DOEs have a reciprocal dispersion characteristic of −3.45 and hence enable an achromatic system to be realized even by a combination of a positive power and a positive power unlike the conventional refracting systems. In view of such characteristic feature of DOEs, the use of DOEs in photographic optical systems is conceived.

First of all, DOEs will be explained. Regarding DOEs, a detailed explanation is given in "Optics" Vol.22, pp.635–642 and pp.730–737.

Conventional lenses are based on the refracting action at the interface of a medium, whereas DOEs are based on the diffracting action of light. In general, when light enters a diffraction grating as shown in FIG. 1, diffracted light emanating from the diffraction grating satisfies the following relationship:

$$\sin\theta - \sin\theta' = m\lambda/d \qquad (a)$$

where $\theta$ is the incident angle; $\theta'$ is the exit angle; $\lambda$ is the wavelength of light; d is the pitch of the diffraction grating; and m is the order of diffraction.

Accordingly, if the pitch of the ring-shaped diffraction grating is appropriately set, the incident light can be converged on a point. That is, a lens action can be given to the diffraction grating. Assuming that the radius of the J-th grating ring is $r_j$ and the focal length of the diffraction surface is f, if the diffraction grating is arranged such that the optical path difference between a light ray diffracted by the J-th grating and a light ray passing through the center is an integral multiple of the wavelength, the two light rays intensify each other. That is, the following relationship is satisfied:

$$\sqrt{(r_j^2 + f^2)} - f = j\lambda \qquad (b\text{-}1)$$

If the focal length is not very long relative to $r_j$, the grating ring radius $r_j$ may be given by $$r_j = \sqrt{(2j\lambda f)} \qquad (b\text{-}2)$$

Examples of diffraction grating configurations hitherto proposed include an amplitude-modulation type in which a diffraction grating is formed from bright and dark rings, and a phase modulation type in which the refractive index or the optical path length is varied. In the amplitude modulation type DOE, a plurality of orders of diffracted light are generated; therefore, the ratio of the amount of first-order diffracted light to the amount of incident light (hereinafter referred to as "diffraction efficiency") is about 6% at the most. Even if the amplitude modulation type DOE is improved by bleaching, the diffraction efficiency is about 34% at the most. In the phase modulation type DOE, however, the diffraction efficiency can be increased up to 100% if it is formed with a sawtooth sectional configuration such as a that shown in FIG. 2. Such a DOE is known as "kinoform". In this case, the height of the crests of the sawtooth sectional configuration is given by $$h = m\lambda/(n-1) \qquad (c)$$

where h is the height of the crests, m is the order of diffraction (hereinafter referred to as "design order of diffraction"), and n is the refractive index of an optical member that forms the diffraction surface.

However, because Eq. (c) is an expression of wavelength, the diffraction efficiency 100% can be attained for only one wavelength. In this case, the diffraction efficiency $D_M(\lambda)$ is given by $$D_M(\lambda) = \mathrm{sinc}^2[\lambda\{M - m\{(1-n)/(1-n_{DOE})\}(\lambda_{DOE}/\lambda)\}] \qquad (d)$$

where M is the working order of diffraction; m is the design order of diffraction; $\lambda$ is the working wavelength; $\lambda_{DOE}$ is the design wavelength; and n and $n_{DOE}$ are the refractive indices for the wavelengths $\lambda$ and $\lambda_{DOE}$, respectively, of the optical member forming the diffraction surface.

The above expression represents that the diffraction efficiency is smaller than 100% for a wavelength other than the design wavelength. As the m th-order diffraction efficiency reduces, other orders [e.g. (m+1)th order and (m−1)th order] of light occurs, and if the other orders of light becomes large in quantity, the light may be undesirably detected as flare. In the following description, m th-order light will be referred to as "design-order light", and the other orders of light will be collectively referred to as "unwanted-order light".

An optical element formed by stepwise approximation of the kinoform configuration as shown in FIG. 3 is known as a "binary optical element", which can be produced relatively easily by a lithographic technique. In the case of binary optical elements, it is known that a diffraction efficiency of 81% is obtained by 4-step approximation; 95% by 8-step approximation; and 99% by 16-step approximation.

DOEs, which have the above-described features, have already been used, for example, in pick-up lenses for compact disks and head-up displays (HUDs) that project an image into the driver's visual field sin the forward-facing front window of an automobile, for example. Thus, DOEs are used only in monochromatic optical systems such as pick-up lenses and other optical systems, such as HUDs, in which the working wavelength range is narrowed to the order of 30 nanometers in order to increase visibility.

However, general photographic optical systems use a wavelength range considerably wider than those used in the above-described optical systems. Accordingly, if a DOE is used in a general photographic optical system, flare increases and affects the image quality. Therefore, it is necessary to solve the problem of unwanted-order light.

Accordingly, various methods have been proposed to solve the problem of flare due to unwanted-order light.

In Japanese Patent Application Unexamined Publication Number [hereinafter referred to as "JP(A)"] 6-194571, a flare quantity in an endoscope objective lens having a DOE is defined by determining a difference between the amount of incident light and the amount of design-order light defined from the diffraction efficiency, and a kinoform blaze wavelength (i.e. a wavelength at which the diffraction efficiency is increased to 100%) is appropriately set, thereby minimizing flare. Further, a weighted flare quantity is defined by taking into consideration the characteristics of the light source and image pick-up device used, and a blaze wavelength is appropriately set to thereby minimize flare.

In JP(A) 7-324262 and 8-43767, a quantity of design-order light is defined in a photographic lens for a camera having a DOE from the diffraction efficiency of the DOE, the spectral characteristics of the image pick-up device and the transmittance of the lens, and a conditional expression is set so that the defined quantity of design-order light is maintained. This means that the amount of flare due to unwanted-order light is consequently minimized. In JP(A) 8-43767 in particular, a wavelength at which the diffraction efficiency is maximized is also set.

In WO95/18393, a quantity of design-order light is defined from the diffraction efficiency in a photographic lens for a camera having a DOE, and a blaze wavelength is set so that the quantity of design-order light is increased.

These inventions employ a method of increasing the efficiency of utilization of design-order light in order to minimize flare due to unwanted-order light.

Hitherto, it has been considered that the problem of flare is minimized in a photographic optical system using a DOE by increasing the efficiency of utilization of design-order light.

However, it has been found that when color photography is carried out with an optical system using a DOE, blue or red flare occurs particularly conspicuously in the color image (such flare will hereinafter be referred to as "color flare").

In the prior art, however, there is almost no mention of color flare, and hence no method or scheme for solving the problem of color flare is disclosed, as stated below.

In JP(A) 6-194571, there is no mention of a specific phenomenon concerning flare nor color of flare. Regarding the spectral characteristics of the image pick-up device, only those for black-and-white images that are expressed by one function are considered. Therefore, the problem of color flare relating to color images remains unsolved in the invention of JP(A) 6-194571.

In JP(A) 7-324262, consideration is also given to only black-and-white images; therefore, the problem of color flare remains unsolved.

In JP(A) 8-43767, there is a slight mention of color flare, but a specific method of solving the problem of color flare is not disclosed.

In WO95/18393, there is no mention of a specific phenomenon concerning flare nor color of flare, and consideration is not given to an image pick-up device. Therefore, the problem of color flare remains unsolved.

Thus, it will be understood that the problem of color flare cannot be solved by any of the prior art devices. Accordingly, it is necessary to note the color flare and to find out a method of minimizing it.

SUMMARY OF THE INVENTION

An object of the present invention is to provide a photographic optical system using a DOE in which color flare is inconspicuous.

To attain the above-described -object, the present invention provides a photographic optical system which has at least one diffractive optical element and in which, assuming that a wavelength at which the diffraction efficiency of the diffractive optical element reaches a maximum is defined as a design wavelength $\lambda_{DOE}$, the design wavelength $\lambda_{DOE}$ satisfies the following condition:

$$0 < E_1(\lambda_{DOE}) + E_3(\lambda_{DOE}) < 0.2 \qquad (1)$$

where $E_1(\lambda_{DOE})$ and $E_3(\lambda_{DOE})$ are as follows:

$$E_1(\lambda_{DOE}) = \left\{ \int D_{m-1}(\lambda_{DOE}, \lambda) L(\lambda) F_1(\lambda) T(\lambda) d\lambda + \int D_{m+1}(\lambda_{DOE}, \lambda) L(\lambda) F_1(\lambda) T(\lambda) d\lambda \right\} \div \left\{ \int L(\lambda) F_1(\lambda) T(\lambda) d\lambda \right\}$$

$$E_3(\lambda_{DOE}) = \left\{ \int D_{m-1}(\lambda_{DOE}, \lambda) L(\lambda) F_3(\lambda) T(\lambda) d\lambda + \int D_{m+1}(\lambda_{DOE}, \lambda) L(\lambda) F_3(\lambda) T(\lambda) d\lambda \right\} \div \left\{ \int L(\lambda) F_3(\lambda) T(\lambda) d\lambda \right\}$$

where:

$$\int L(\lambda) F_1(\lambda) T(\lambda) d\lambda = \int L(\lambda) F_2(\lambda) T(\lambda) d\lambda = \int L(\lambda) F_3(\lambda) T(\lambda) d\lambda$$

In the above expressions:

$D_{m-1}(\lambda_{DOE}, \lambda)$, $D_{m+1}(\lambda_{DOE}, \lambda)$: the diffraction efficiencies for (m−1)th and (m+1)th orders at wavelength $\lambda$ when the design order of diffraction and design wavelength of the diffractive optical element are m and $\lambda_{DOE}$, respectively;

$L(\lambda)$: the spectral characteristics at $\lambda$ of a light source;

$F_1(\lambda)$, $F_2(\lambda)$, $F_3(\lambda)$: spectral sensitivity characteristics of light-receiving elements provided in an image pick-up device to detect light in predetermined wavelength regions, respectively, wherein the spectral sensitivity characteristics are defined as $F_1(\lambda)$, $F_2(\lambda)$ and $F_3(\lambda)$, respectively, in the order of increasing wavelength at which the spectral sensitivity reaches a maximum.

$T(\lambda)$: the transmittance at $\lambda$ of the photographic optical system.

The reasons for adopting the above-described arrangement in the present invention, together with the functions thereof, will be explained below.

First, the cause of color flare will be described. Let us clarify the diffraction efficiency of unwanted-order light because unwanted-order light produced by a DOE is concerned with color flare.

If Eq. (d) of diffraction efficiency is calculated on the assumption that the design order of diffraction m is 1; the design wavelength $\lambda_{DOE}$ at which the diffraction efficiency is maximized is 500 nanometers; and the optical member forming the diffraction surface is an acrylic resin material, the relationship between the diffraction efficiency and the wavelength is such as that shown in the graph of FIG. 4. As will be understood from the graph, the diffraction efficiency reaches 100% at the design wavelength 500 nanometers, but as the diffraction efficiency of design-order light, which is first-order light, reduces according to wavelength, the diffraction efficiency of zero- or second-order light increases undesirably. In other words, unwanted light other than design-order light is generated. The graphs of FIGS. 5 and 6 show the results of the calculation performed with the design wavelength set at 450 nanometers and 550 nanometers, respectively. It will be understood from these graphs that the diffraction efficiency of unwanted-order light changes to a considerable extent with the design wavelength.

Regarding higher orders of diffraction, i.e. m+2, m+3, . . . , and m−1, m−2, . . . , as shown in FIG. 7, as the order of diffraction deviates further from the design order m, the diffraction efficiency becomes smaller, and flare light becomes weaker. Consequently, the influence of flare light weakens. Therefore, among unwanted orders of light, (m−1)th and (m+1)th orders have the greatest influence.

Next, the spectral characteristics of image pick-up devices will be explained. Image pick-up devices are devices for recording images, e.g. a silver halide film and a CCD. FIG. 8 shows the spectral characteristics of a general color film, by way of example. In general, an image pick-up device has at least three light-receiving elements divided for respective wavelength regions. Light received by the light-receiving elements are mixed together to reproduce a color image. The three light-receiving elements will hereinafter be referred to as "first, second and third light-receiving elements", respectively, in the order of increasing spectral sensitivity peak wavelength. A color film used in a silver halide camera also has light-receiving elements comprising three photosensitive layers. In general, the three photosensitive layers are arranged to have peak wavelengths in the blue, green and red wavelength regions, respectively.

It will be understood from the two graphs showing the diffraction efficiency and the spectral characteristics of the image pick-up device that, in the case of FIG. 6, (m+1)th-order light, that is, second-order light, is strong and hence likely to be recorded by the first light-receiving element, and in the case of FIG. 5, (m−1)th-order light, that is, zero-order light, is strong and hence likely to be recorded by the third light-receiving element. For this reason, blue or red color flare is likely to occur. It will also be understood that color flare is unlikely to occur in the second light-receiving element because the amount of unwanted-order light is small in either of FIGS. 5 and 6.

Accordingly, it may be said that blue or red color flare is caused by the fact that the amount of (m+1)th-order light or (m−1)th-order light received by the first or third light-receiving element is undesirably large.

To solve this problem, the present invention employs a scheme for optimizing the design wavelength $\lambda_{DOE}$ of a DOE at which the diffraction efficiency is maximized so that color flare becomes inconspicuous. For this purpose, a quantity of color flare due to unwanted-order light is defined from spectral characteristics, and the design wavelength is set so that the quantity of color flare is minimized.

The procedure and operation for optimizing the design wavelength $\lambda_{DOE}$ will be described below, in order. The results of the actual calculations will also be explained in regard to the first embodiment (described later).

First, let us explain spectral characteristics of a photographic optical system using a DOE. The spectral characteristics of a typical conventional photographic optical system are determined by the following factors: the light source, the image pick-up device, and the transmittance of the lens. In particular, when the image pick-up device is divided into light-receiving elements adapted for three wavelength regions, the spectral characteristics are defined as follows:

$$L(\lambda)F_1(\lambda)T(\lambda) \tag{e-1}$$

$$L(\lambda)F_2(\lambda)T(\lambda) \tag{e-2}$$

$$L(\lambda)F_3(\lambda)T(\lambda) \tag{e-3}$$

where $L(\lambda)$ is the spectral characteristics for $\lambda$ of the light source; $F_1(\lambda)$, $F_2(\lambda)$ and $F_3(\lambda)$ are the spectral sensitivity characteristics for $\lambda$ of the light-receiving elements provided in the image pick-up device to detect light in respective wavelength regions; and $T(\lambda)$ is the transmittance for $\lambda$ of the photographic optical system.

The relationship between the above expressions is given by $$\int L(\lambda)F_1(\lambda)T(\lambda)d\lambda = \int L(\lambda)F_2(\lambda)T(\lambda)d\lambda \tag{f}$$
$$= \int L(\lambda)F_3(\lambda)T(\lambda)d\lambda$$

With the respective outputs of the light-receiving elements made equal to each other, colors are mixed together to thereby effect color reproduction with good color balance.

FIG. 11 is a graph showing spectral characteristics obtained by performing calculations with respect to $L(\lambda)$, $F_1(\lambda)$, $F_2(\lambda)$, $F_3(\lambda)$ and $T(\lambda)$ under the conditions in the first embodiment (described later): The light source is a white light source (D5500) having spectral characteristics as shown in FIG. 9; the image pick-up device is a general color film having spectral characteristics as shown in FIG. 8, and the transmittance of the lens is such as that shown in FIG. 10.

If a DOE is used in the photographic optical system, the factor of the m th-order diffraction efficiency $D_m(\lambda)$ is further added. The diffraction efficiency $D_m(\lambda)$ may be given by an expression of the design wavelength $\lambda_{DOE}$ and $\lambda$, i.e. $D_m(\lambda_{DOE}, \lambda)$. Accordingly, spectral characteristics when a DOE having the design wavelength $\lambda_{DOE}$ is used may be defined as shown below. To make a comparison with a general photographic optical system, which uses no DOE, let us assume that the following expressions also satisfy Eq. (f).

$$D_m(\lambda_{DOE}, \lambda)L(\lambda)F_1(\lambda)T(\lambda) \tag{h-1}$$

$$D_m(\lambda_{DOE}, \lambda)L(\lambda)F_2(\lambda)T(\lambda) \tag{h-2}$$

$$D_m(\lambda_{DOE}, \lambda)L(\lambda)F_3(\lambda)T(\lambda) \tag{h-3}$$

It is also possible to define spectral characteristics for unwanted-order light by using the above expressions. Assuming the design order to be m, spectral characteristics for (m−1)th-order light, which is unwanted-order light, may be defined as follows:

$$D_{m-1}(\lambda_{DOE},\lambda)L(\lambda)F_1(\lambda)T(\lambda) \qquad (i\text{-}1)$$

$$D_{m-1}(\lambda_{DOE},\lambda)L(\lambda)F_2(\lambda)T(\lambda) \qquad (i\text{-}2)$$

$$D_{m-1}(\lambda_{DOE},\lambda)L(\lambda)F_3(\lambda)T(\lambda) \qquad (i\text{-}3)$$

Similarly, spectral characteristics for (m+1)th-order light, which is unwanted-order light, may be defined as follows:

$$D_{m+1}(\lambda_{DOE},\lambda)L(\lambda)F_1(\lambda)T(\lambda) \qquad (J\text{-}1)$$

$$D_{m+1}(\lambda_{DOE},\lambda)L(\lambda)F_2(\lambda)T(\lambda) \qquad (J\text{-}2)$$

$$D_{m+1}(\lambda_{DOE},\lambda)L(\lambda)F_3(\lambda)T(\lambda) \qquad (J\text{-}3)$$

If a diffraction surface is formed from a kinoform, the diffraction efficiency characteristics are expressed by Eq. (d). If calculations are performed with respect to Eqs. (h-1) to (h-3), Eqs. (i-1) to (i-3), and Eqs. (J-1) to (J-3) under the conditions shown in the first embodiment (described later) on the assumption that the design order m=1, spectral characteristics are defined as shown in FIG. 12(a) and FIG. 12(b) which is an enlarged view showing the portions of unwanted-order light in the graph of FIG. 12(a). It will be understood by a comparison with FIG. 11, which shows the spectral characteristics of a general photographic optical system using no DOE, that the spectral characteristics for m th-order light (first-order light in this case), which is design-order light, reduce, while the spectral characteristics for (m−1)th- and (m+1)th-order light (zero- and second-order light), which are unwanted orders of light, increase correspondingly. The unwanted-order light causes color flare.

Thus, the spectral characteristics for unwanted-order light have been clarified. Next, let us define a color flare quantity from the spectral characteristics thus defined. The values represented by the spectral characteristics are the energy of light at the wavelength recorded after passing through the optical system. Therefore, to obtain a total amount of light energy concerned with image formation, the spectral characteristics should be integrated over all λ. In other words, the areas in FIG. 12(b), which shows the spectral characteristics, are color flare quantities.

Accordingly, the color flare quantities can be defined from the integrals of Eqs. (i-1) to (i-3) and Eqs. (J-1) to (J-3). Thus, (m−1)th- and (m+1)th-order color flare quantities are defined and summed up. Then, the sum is normalized. By doing so, color flare quantities can be given as expressed by the following Eqs. (k-1) to (k-3) for the first to third light-receiving elements, respectively.

The quantity of color flare received by the first light-receiving element:

$$\left\{\int D_{m-1}(\lambda_{DOE},\lambda)L(\lambda)F_1(\lambda)T(\lambda)d\lambda + \right. \qquad (k\text{-}1)$$
$$\left. \int D_{m+1}(\lambda_{DOE},\lambda)L(\lambda)F_1(\lambda)T(\lambda)d\lambda \right\} \div \left\{\int L(\lambda)F_1(\lambda)T(\lambda)d\lambda\right\}$$

The quantity of color flare received by the second light-receiving element:

$$\left\{\int D_{m-1}(\lambda_{DOE},\lambda)L(\lambda)F_2(\lambda)T(\lambda)d\lambda + \right. \qquad (k\text{-}2)$$
$$\left. \int D_{m+1}(\lambda_{DOE},\lambda)L(\lambda)F_2(\lambda)T(\lambda)d\lambda \right\} \div \left\{\int L(\lambda)F_2(\lambda)T(\lambda)d\lambda\right\}$$

The quantity of color flare received by the third light-receiving element:

$$\left\{\int D_{m-1}(\lambda_{DOE},\lambda)L(\lambda)F_3(\lambda)T(\lambda)d\lambda + \right. \qquad (k\text{-}3)$$
$$\left. \int D_{m+1}(\lambda_{DOE},\lambda)L(\lambda)F_3(\lambda)T(\lambda)d\lambda \right\} \div \left\{\int L(\lambda)F_3(\lambda)T(\lambda)d\lambda\right\}$$

Among the three color flare quantities, the quantity of color flare received by the first or third light-receiving element can be said to be a matter of concern because the color flare in question is blue or red flare. Therefore, a DOE design wavelength $\lambda_{DOE}$ should be determined such that the quantities of Eqs. (k-1) and (k-3), which represent the blue and red flare quantities, respectively, are minimized.

Assuming Eqs. (k-1) and (k-3) to be $E_1(\lambda_{DOE})$ and $E_3(\lambda_{DOE})$ respectively, it is necessary in order to make color flare inconspicuous to set the DOE design wavelength $\lambda_{DOE}$ so as to satisfy the following condition:

$$0<E_1(\lambda_{DOE})+E_3(\lambda_{DOE})<0.2 \qquad (1)$$

The condition (1) shows the sum of the blue and red flare quantities when the design wavelength is $\lambda_{DOE}$. Accordingly, if the sum of the blue and red flare quantities is not smaller than the upper limit of the condition (1), i.e. 0.2, color flare becomes conspicuous, causing the image quality to be degraded.

If the design wavelength is optimized as described above, it is possible to obtain a photographic optical system with minimized color flare.

To obtain higher image quality, it is preferable to balance the blue and red flare quantities. For this purpose, it is preferable to satisfy the following condition:

$$0.20<E_1(\lambda_{DOE})/E_3(\lambda_{DOE})<5 \qquad (2)$$

The condition (2) expresses the ratio of the blue flare quantity to the red flare quantity at the design wavelength $\lambda_{DOE}$. If the ratio expressed by the condition (2) is 1, blue flare and red flare have the same intensity. If the flare quantity ratio is not smaller than the upper limit of the condition (2), i.e. 5, blue flare becomes relatively conspicuous whereas, if the ratio is not larger than the lower limit, i.e. 0.20, red flare becomes relatively conspicuous.

In observation with the human eyes, red is more conspicuous than blue. Therefore, it is even more desirable to satisfy the following condition:

$$1<E_1(\lambda_{DOE})/E_3(\lambda_{DOE})<5 \qquad (3)$$

In the actual optimization of the design wavelength under the conditions of a silver halide camera or an electronic camera, it is preferable for the DOE design wavelength to satisfy the following condition:

$$470 \text{ nanometers}<\lambda_{DOE}<550 \text{ nanometers} \qquad (4)$$

The above expression (4) is a condition for setting a design wavelength at which the diffraction efficiency of the DOE is maximized. If $\lambda_{DOE}$ is not smaller than the upper limit of the condition (4), i.e. 550 nanometers, blue flare becomes conspicuous, whereas, if $\lambda_{DOE}$ is not larger than the lower limit, i.e. 470 nanometers, red flare becomes conspicuous.

Since red is more conspicuous than blue in observation with the human eyes, it is even more desirable to satisfy the following condition:

$$510 \text{ nanometers} < \lambda_{DOE} < 550 \text{ nanometers} \quad (5)$$

FIG. 13 is a graph showing color flare quantities obtained under the conditions in the first embodiment (described later). Thus, the problem of color flare is alleviated by setting the DOE design wavelength within the range defined by the condition (4) or (5).

To increase the light utilization efficiency of the photographic optical system, the diffraction surface of the DOE is preferably formed from a kinoform configuration, which makes it possible to increase the diffraction efficiency, or a binary optical element formed by stepwise approximation to the kinoform configuration.

The photographic optical system according to the present invention is used in a relatively wide wavelength range. Therefore, it is preferable from the viewpoint of reducing color flare to minimize the reduction of the diffraction efficiency when the wavelength changes. FIG. 14 is a graph showing diffraction efficiencies when the design order m is 1, 2, 3, 4 and 5, respectively. As will be clear from the graph, as the design order m increases, the reduction of the diffraction efficiency due to the wavelength change increases, causing the amount of color flare generated to increase. Therefore, it is preferable to set the design order m to 1.

When the diffraction surface has a kinoform configuration such as that shown in FIG. 2, it is preferable that the height h of the sawtooth crests of the kinoform configuration should satisfy the following condition:

$$0.48 \text{ micrometer} < h < 1.25 \text{ micrometers} \quad (6)$$

The expression (6) is a condition for setting the height of the sawtooth crests of the kinoform configuration when the design order is set to 1. With this arrangement, the light utilization efficiency can be increased, and moreover, the problem of color flare can also be alleviated. If h is not smaller than the upper limit of the condition (6), i.e. 1.25 micrometers, blue flare becomes conspicuous, whereas, if h is not larger than the lower limit, i.e 0.48 micrometer, red flare becomes conspicuous.

In observation with the human eyes, red is more conspicuous than blue. Therefore, it is even more desirable to satisfy the following condition:

$$0.53 \text{ micrometer} < h < 1.25 \text{ micrometers} \quad (7)$$

The diffraction efficiency of a DOE reduces when the wavelength changes, and color flare is undesirably generated. Accordingly, if two or more diffraction surfaces are used, the amount of color flare generated becomes larger. Therefore, it is preferable to use a single diffraction surface from the viewpoint of attaining high image quality.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Some embodiments of the photographic optical system using a DOE according to the present invention will be described below.

(First embodiment)

Figure 1:
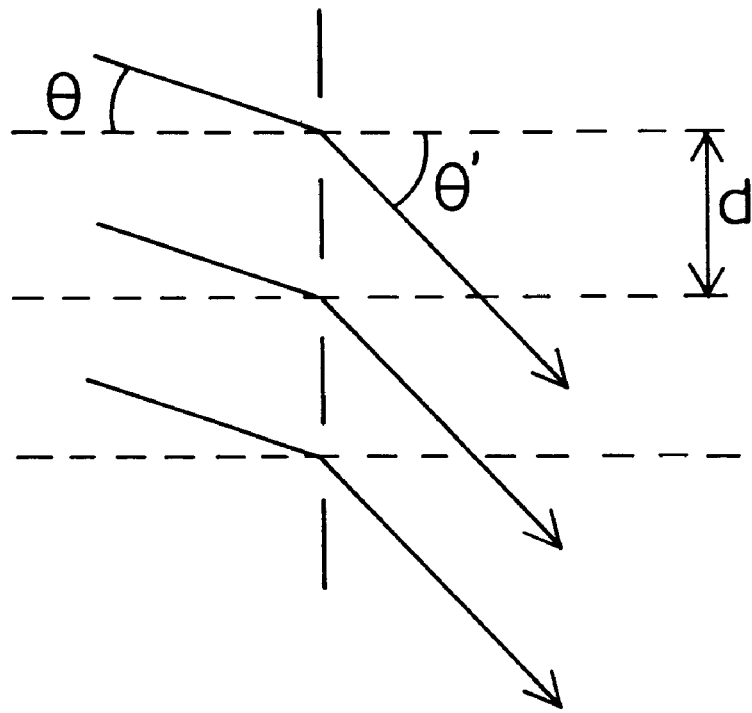
FIG. 1 is a diagram for describing a diffraction phenomenon caused by a diffraction grating.
Figure 2:
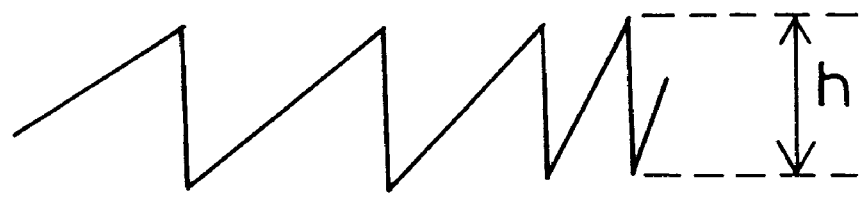
FIG. 2 is a diagram showing the sectional configuration of a kinoform.
Figure 3:
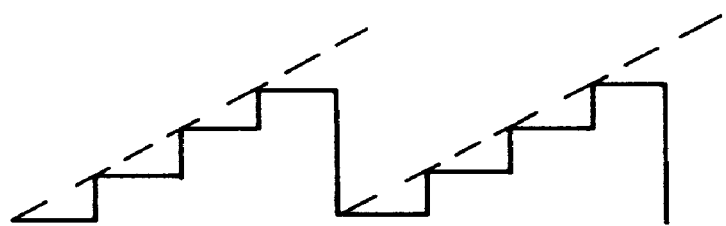
FIG. 3 is a diagram showing the sectional configuration of a binary optical element.
Figure 4:
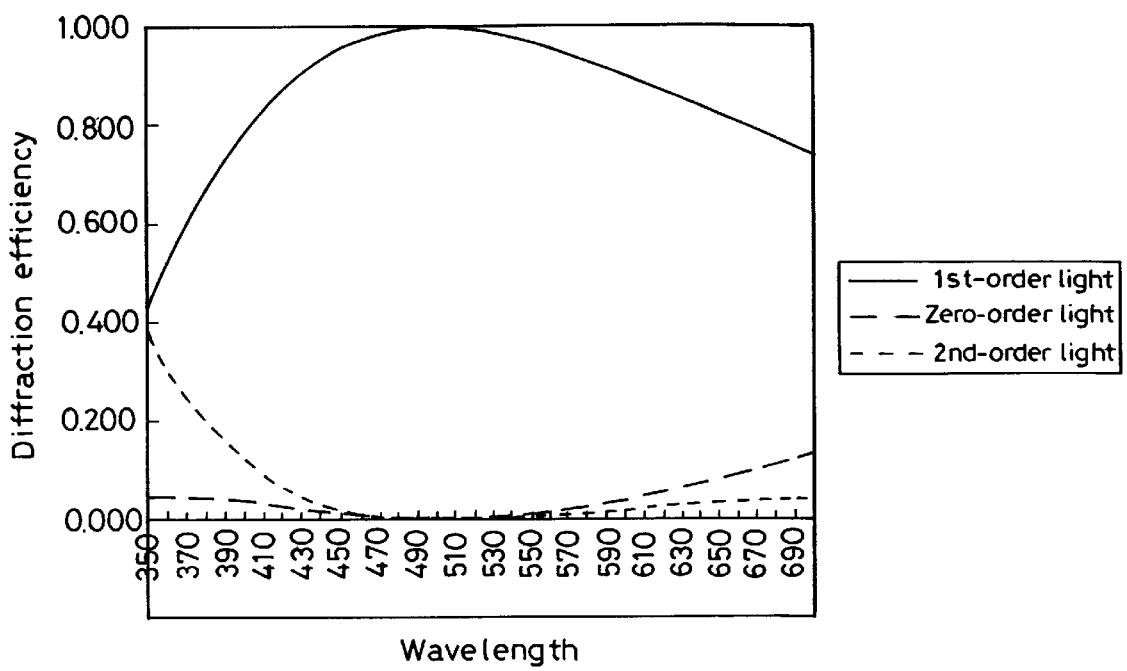
FIG. 4 is a graph showing the relationship between the wavelength and the diffraction efficiency when the design wavelength is set to 500 nanometers.
Figure 5:
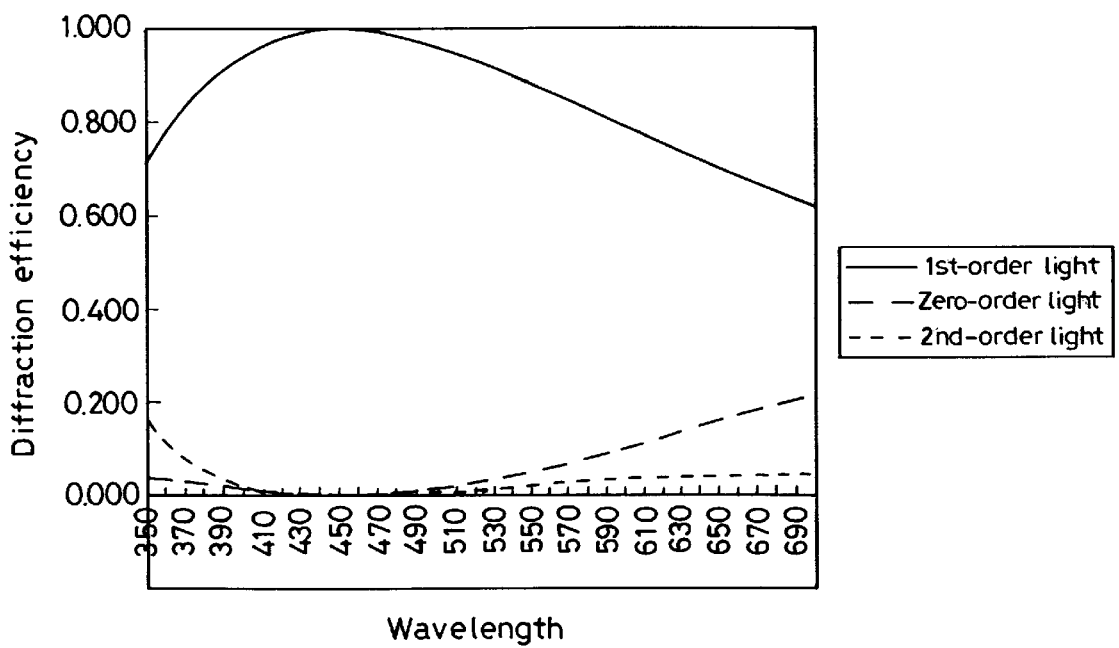
FIG. 5 is a graph showing the relationship between the wavelength and the diffraction efficiency when the design wavelength is set to 450 nanometers.
Figure 6:
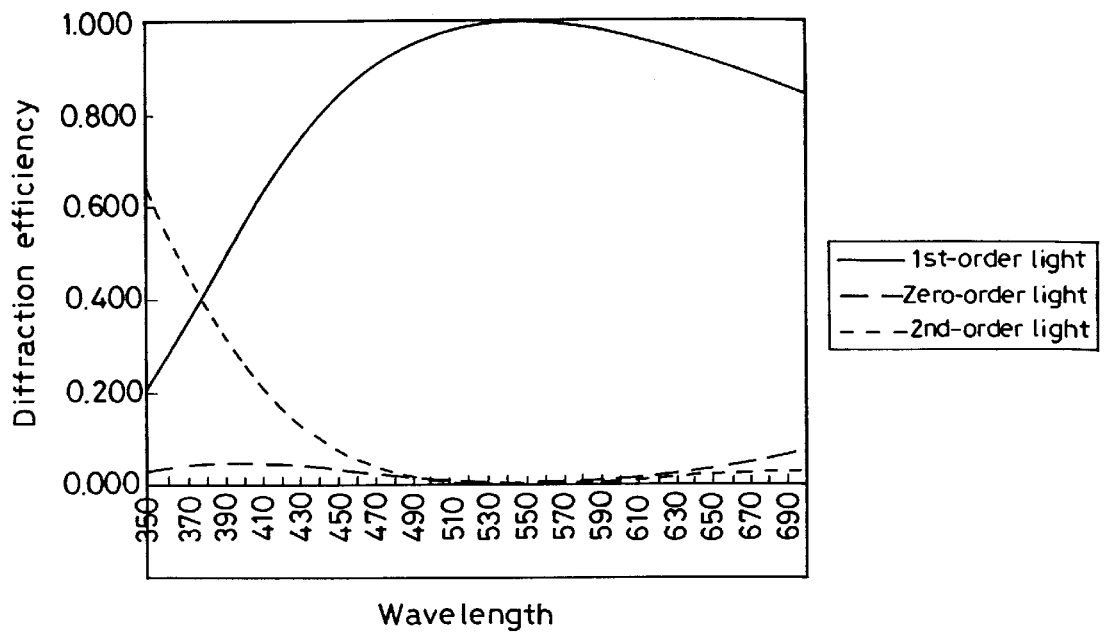
FIG. 6 is a graph showing the relationship between the wavelength and the diffraction efficiency when the design wavelength is set to 550 nanometers.
Figure 7:
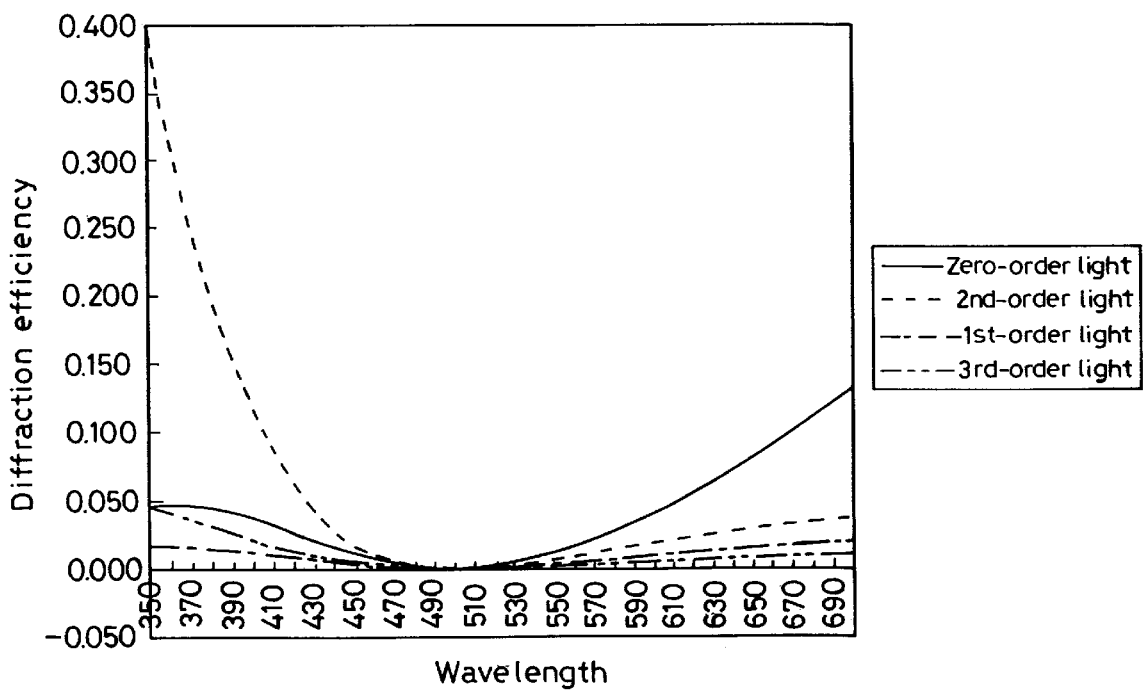
FIG. 7 is a graph showing the relationship between the wavelength of unwanted-order light and the diffraction efficiency when the design wavelength is set to 500 nanometers.
Figure 8:
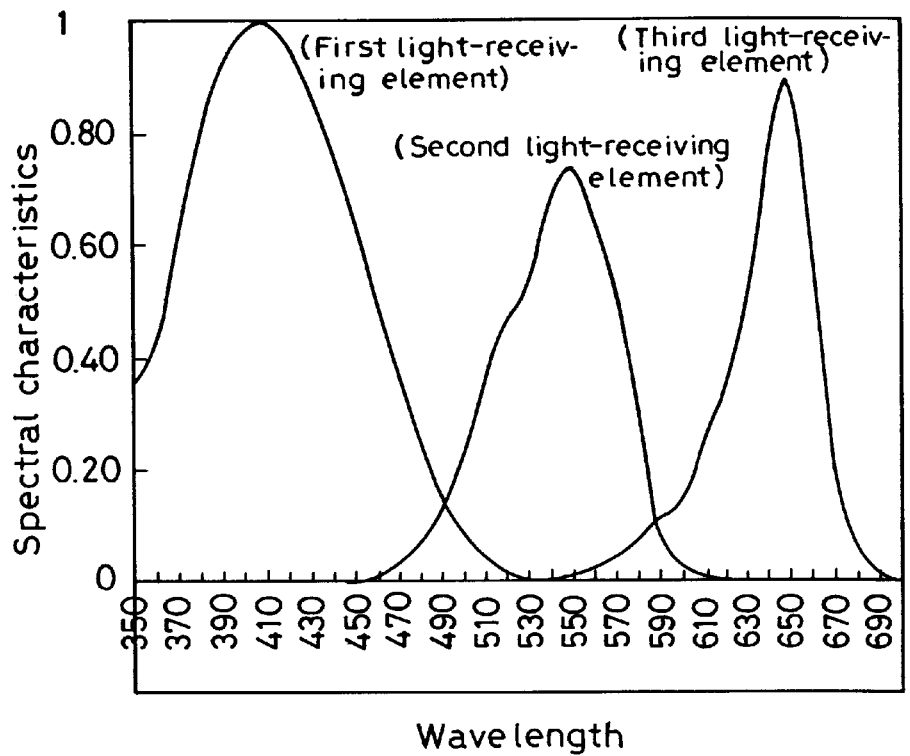
FIG. 8 is a graph showing the spectral characteristics of a general color film.
Figure 9:
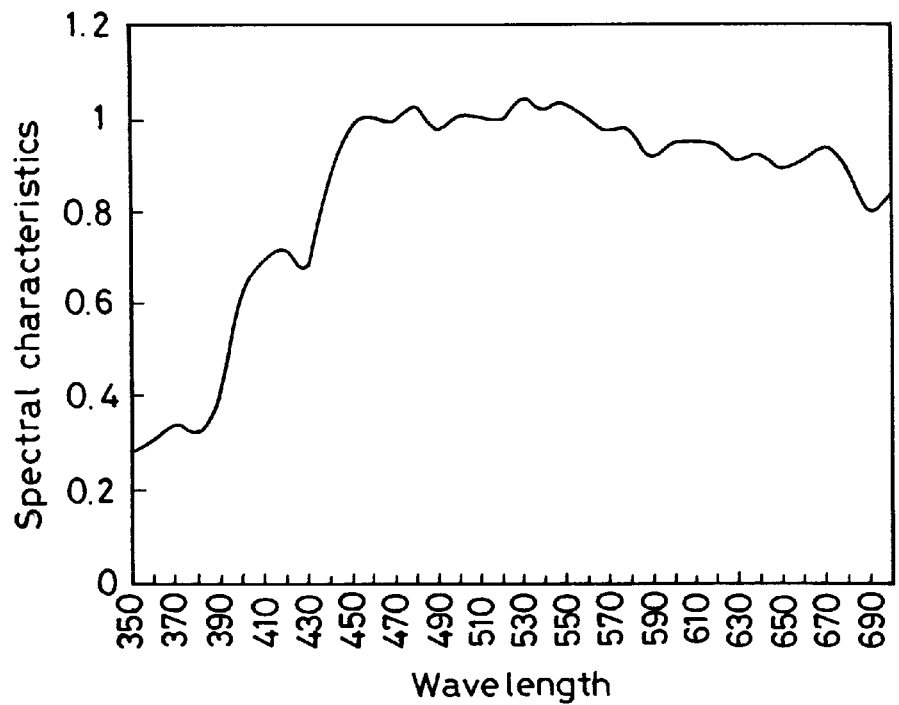
FIG. 9 is a graph showing the spectral characteristics of a white light source (D5500) in the first and third embodiments of the present invention.
Figure 10:
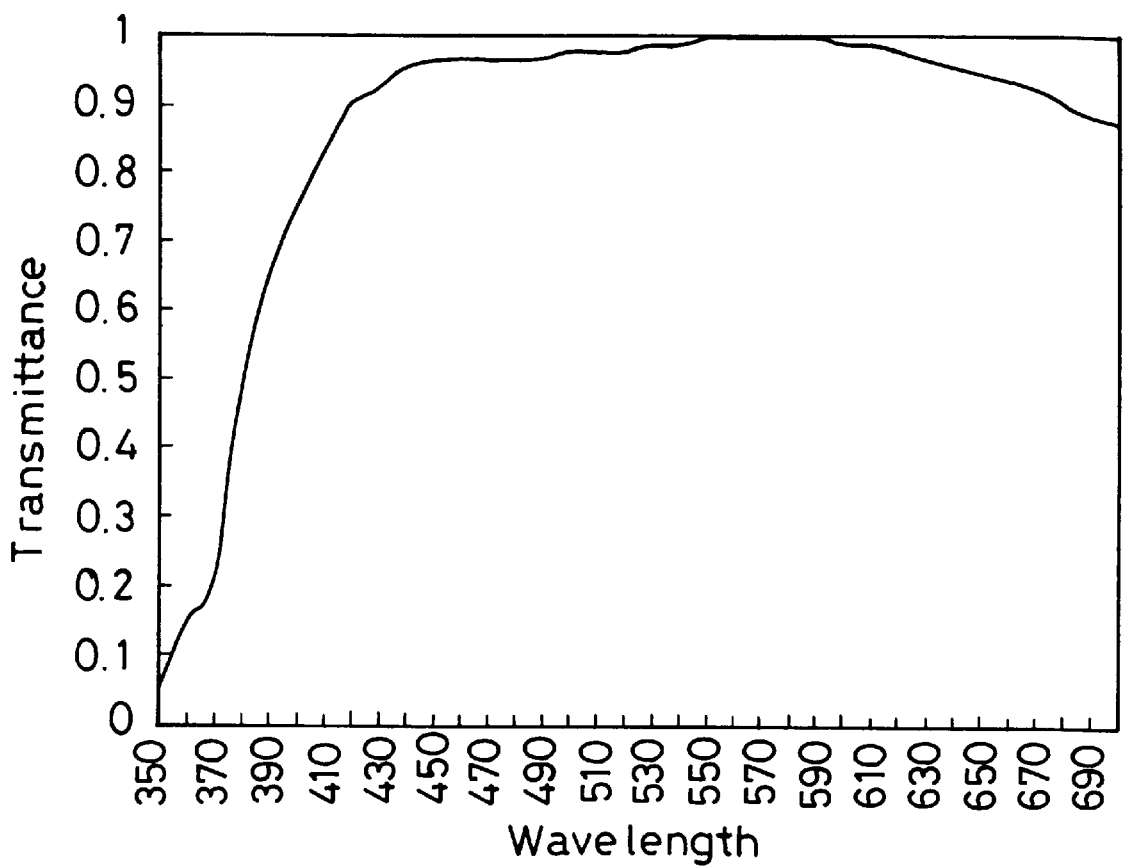
FIG. 10 is a graph showing the spectral transmittance of a lens in the first and second embodiments of the present invention.
Figure 11:
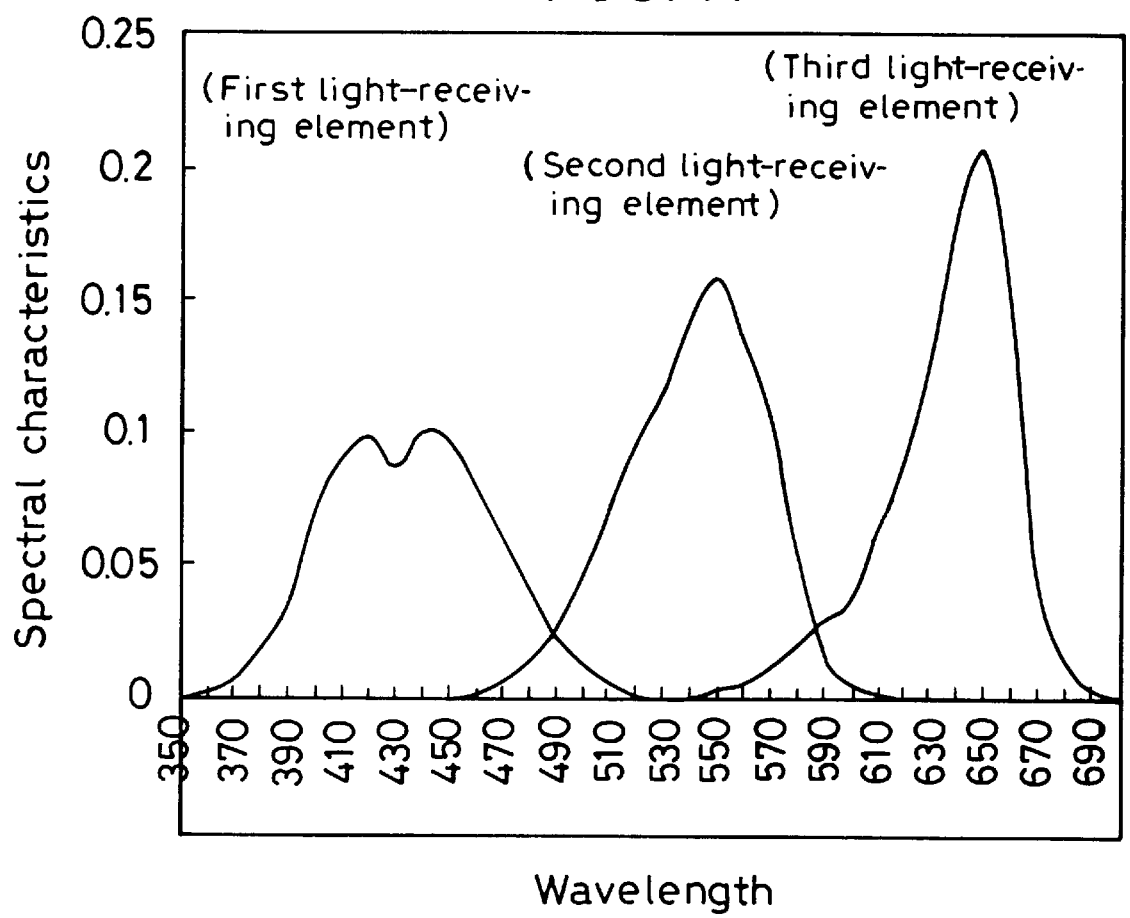
FIG. 11 is a graph showing the spectral characteristics of a photographic optical system using no DOE under the conditions in the first embodiment.
Figure 12:
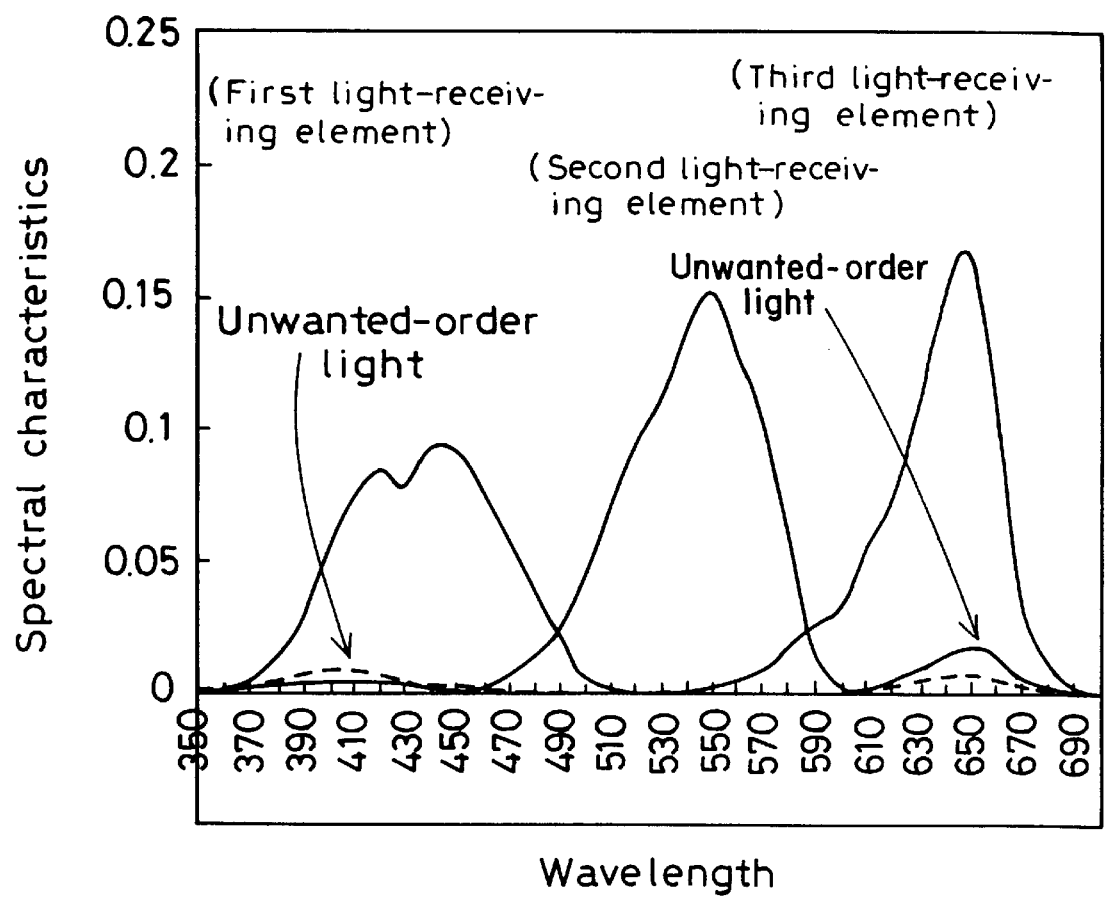
FIG. 12(a) is a graph showing the spectral characteristics of a photographic optical system using a DOE under the conditions in the first embodiment.
FIG. 12(b) is an enlarged view showing the portions of unwanted-order light in the graph of FIG. 12(a).
Figure 12:
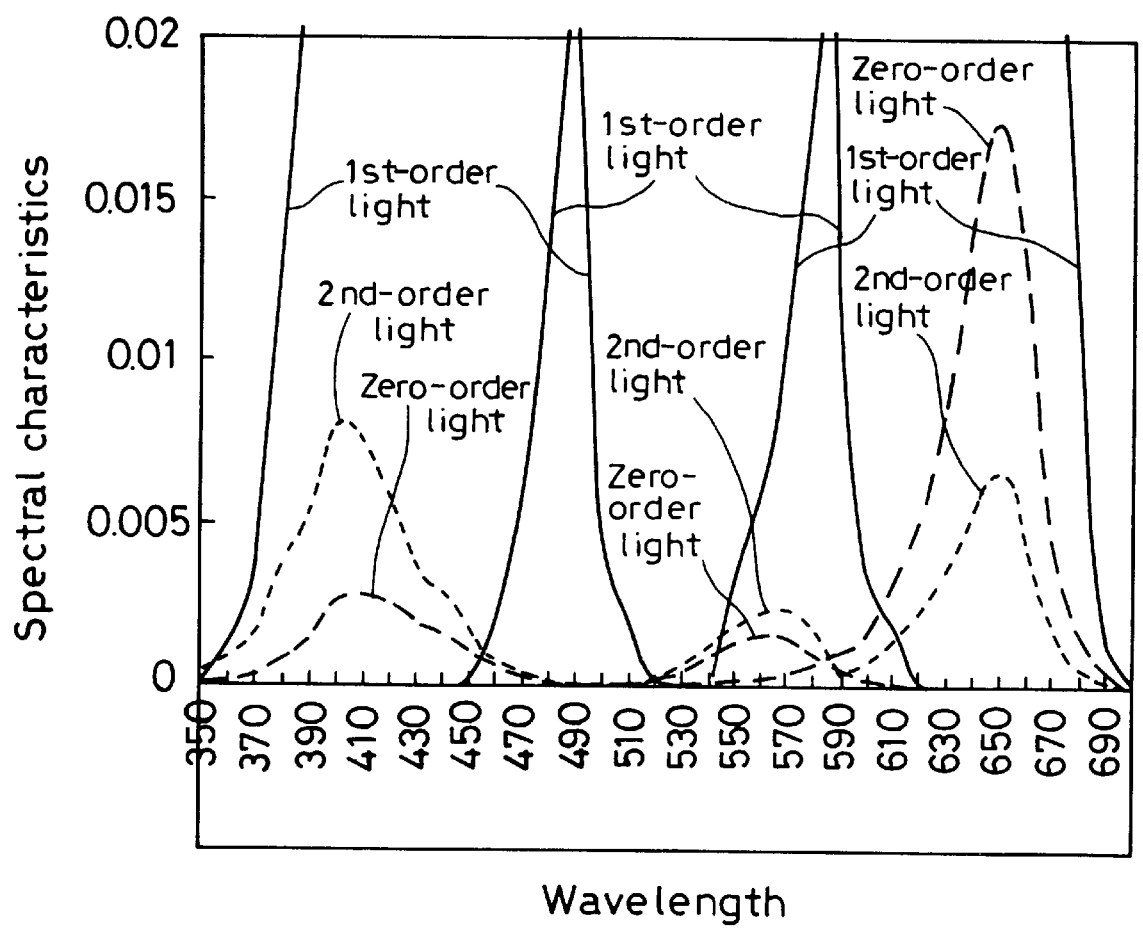

In the first embodiment, color flare quantities $E_1(\lambda_{DOE})$ and $E_3(\lambda_{DOE})$ are calculated in the design wavelength range of from 440 to 560 nanometers of the DOE under the conditions that the spectral characteristics of the light source are those of a white light source (D5500), as shown in FIG. 9. The spectral characteristics of the image pick-up device are those of a general color film, as shown in FIG. 8. The transmittance of the lens is such as that shown in FIG. 10. Regarding the diffraction efficiency of the DOE, the design order m of diffraction is 1, and the optical member forming the diffraction surface is an acrylic resin material. It should be noted that the integration calculation of $E_1(\lambda_{DOE})$ and $E_3(\lambda_{DOE})$ in the conditional expressions is performed by summing $\Sigma$, spectral characteristic values every 10 nanometers. The calculation is performed in the range of 350 nanometers to 700 nanometers.

Figure 13:
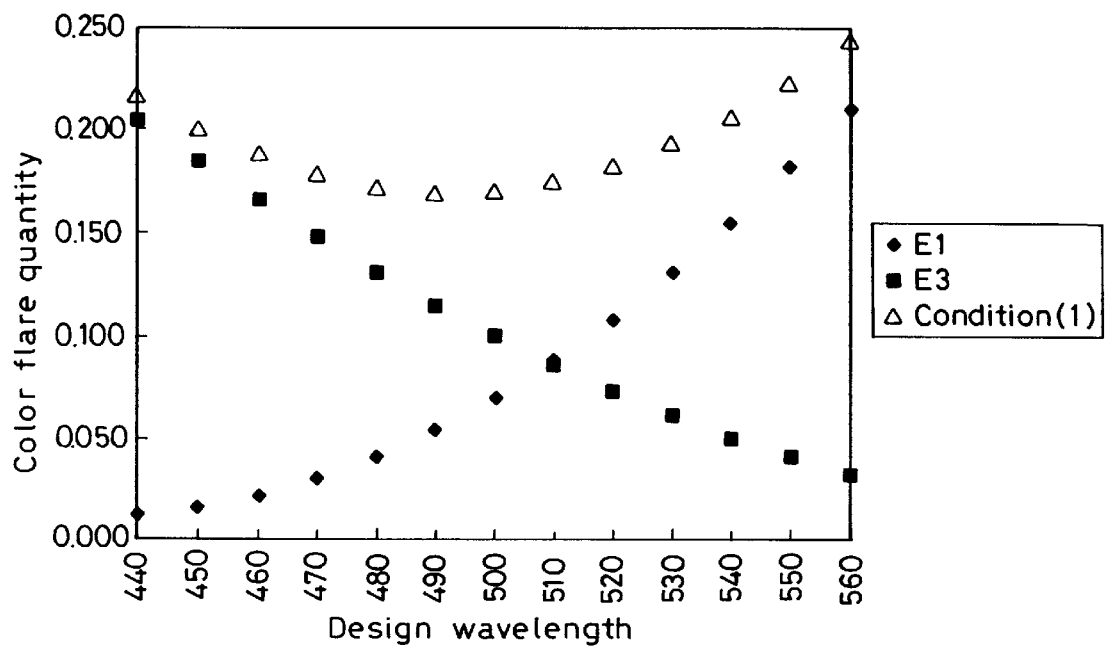
FIG. 13 is a graph showing the relationship between the design wavelength and the amount of color flare caused by unwanted-order light in the first embodiment.
Figure 14:
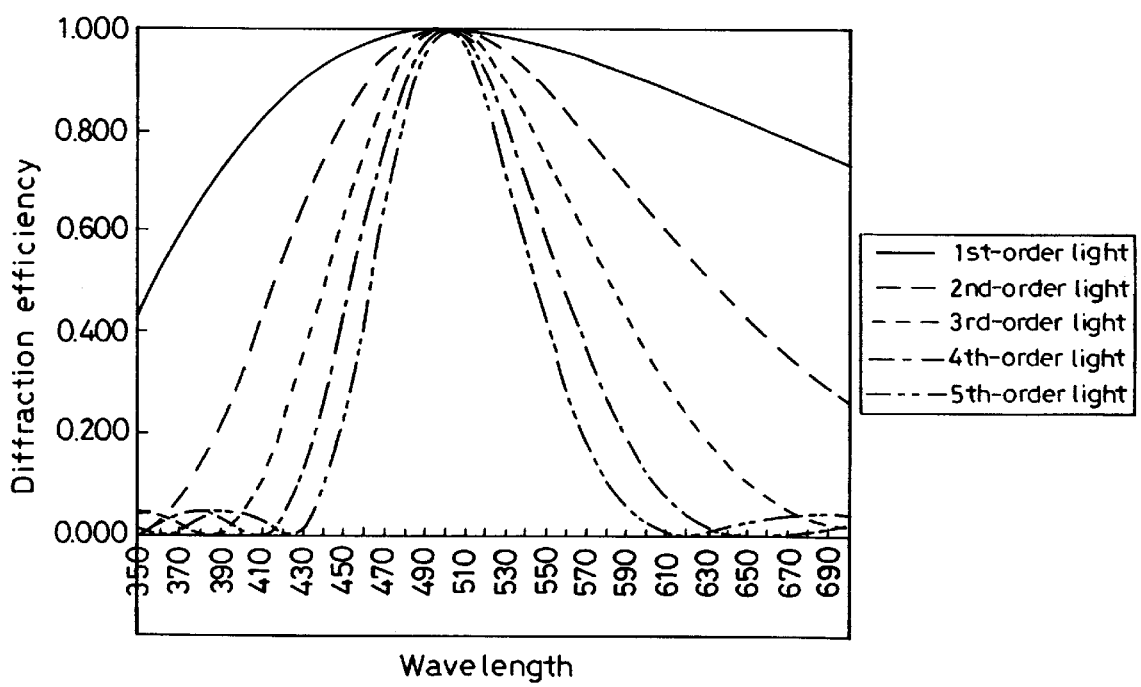
FIG. 14 is a graph showing the change of the diffraction efficiency when the design order is varied from 1 through 5.

It will be understood from FIG. 13, which shows the results of the calculation, that the design wavelength that satisfies the condition (1) is in the range of from about 450 nanometers to about 530 nanometers. Further, it will be understood from the table below, which shows the calculated results, that the design wavelength that satisfies the condition (2) is in the range of from about 470 nanometers to about 530 nanometers.

EXAMPLE 1

| $\lambda_{DOE}$ | $E_1$ | $E_3$ | Condition (1) | Condition (2) |
|---|---|---|---|---|
| 440 | 0.012 | 0.204 | 0.216 | 0.060 |
| 450 | 0.016 | 0.185 | 0.200 | 0.086 |
| 460 | 0.022 | 0.166 | 0.188 | 0.133 |
| 470 | 0.031 | 0.148 | 0.179 | 0.207 |
| 480 | 0.042 | 0.131 | 0.173 | 0.317 |
| 490 | 0.055 | 0.115 | 0.170 | 0.477 |
| 500 | 0.071 | 0.101 | 0.171 | 0.704 |
| 510 | 0.089 | 0.087 | 0.176 | 1.024 |
| 520 | 0.109 | 0.074 | 0.183 | 1.474 |
| 530 | 0.131 | 0.062 | 0.194 | 2.112 |
| 540 | 0.156 | 0.052 | 0.207 | 3.023 |
| 550 | 0.182 | 0.042 | 0.224 | 4.346 |
| 560 | 0.210 | 0.033 | 0.243 | 6.308 |

(Second embodiment)

Figure 15:
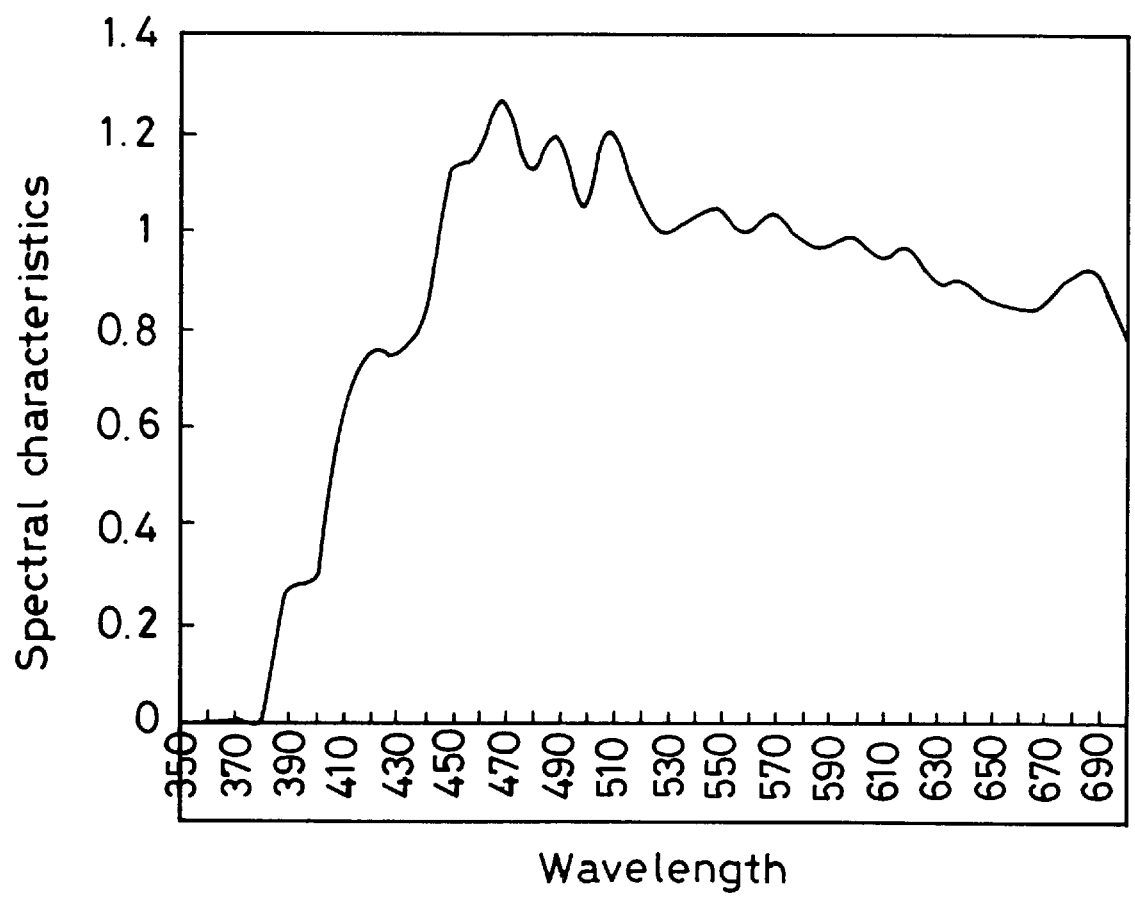
FIG. 15 is a graph showing the spectral characteristics of a strobe light source in the second embodiment.

In the second embodiment, color flare quantities $E_1(\lambda_{DOE})$ and $E_3(\lambda_{DOE})$ are calculated in the design wavelength range of 440 to 560 nanometers of the DOE under the conditions that the spectral characteristics of the light source, are those of a strobe light source as shown in FIG. 15. The spectral characteristics of the image pick-up device are those of a general color film as shown in FIG. 8. The transmittance of the lens is such as that shown in FIG. 10. Regarding the diffraction efficiency of the DOE, the design order m of diffraction is 1, and the optical member forming the diffraction surface is an optical glass S-LAH66 (OHARA). It should be noted that the integration calculation of $E_1(\lambda_{DOE})$ and $E_3(\lambda_{DOE})$ in the conditional expressions is performed by summing, $\Sigma$, spectral characteristic values every 10 nanometers. The calculation is performed in the range of 350 nanometers to 700 nanometers.

Figure 18:
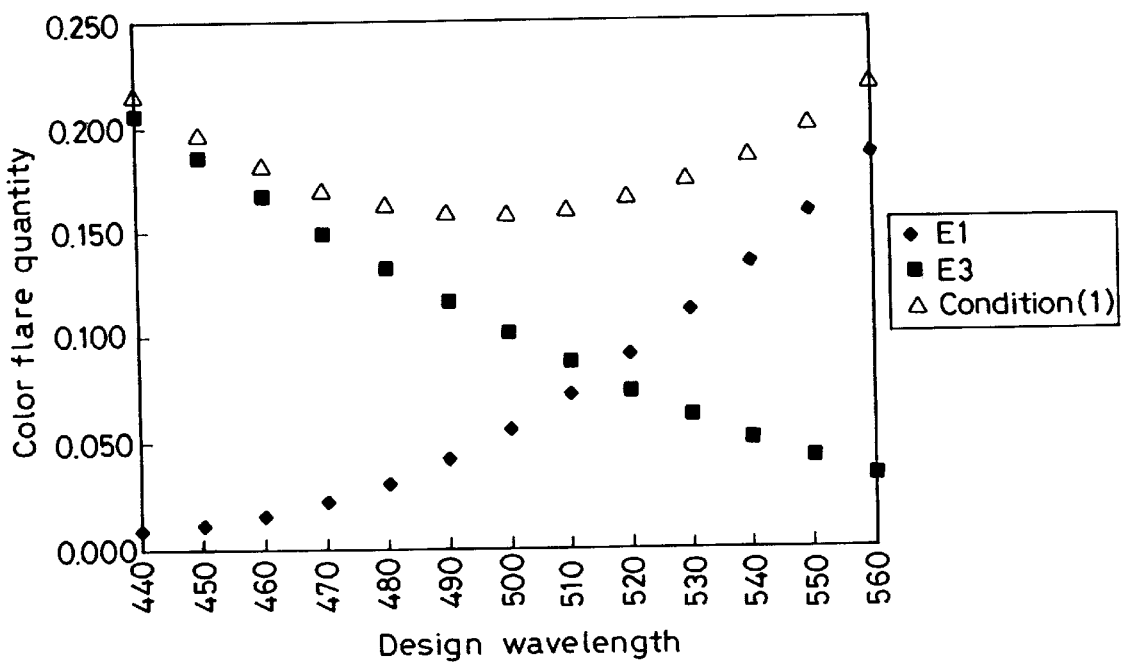
FIG. 18 is a graph showing the relationship between the design wavelength and the amount of color flare caused by unwanted-order light in the-second embodiment.

It will be understood from FIG. 18, which shows the results of the calculation, that the design wavelength that satisfies the condition (1) is in the range of about 450 nanometers to about 550 nanometers. Further, it will be understood from the table below, which shows the calculated results, that the design wavelength that satisfies the condition (2) is in the range of from about 480 nanometers to about 530 nanometers.

EXAMPLE 2

| $\lambda_{DOE}$ | $E_1$ | $E_3$ | Condition (1) | Condition (2) |
|---|---|---|---|---|
| 440 | 0.009 | 0.206 | 0.215 | 0.044 |
| 450 | 0.011 | 0.186 | 0.197 | 0.057 |
| 460 | 0.015 | 0.167 | 0.182 | 0.089 |
| 470 | 0.022 | 0.149 | 0.171 | 0.145 |
| 480 | 0.031 | 0.132 | 0.163 | 0.232 |
| 490 | 0.042 | 0.116 | 0.159 | 0.363 |
| 500 | 0.056 | 0.101 | 0.158 | 0.554 |
| 510 | 0.072 | 0.087 | 0.160 | 0.829 |
| 520 | 0.091 | 0.074 | 0.165 | 1.220 |
| 530 | 0.111 | 0.063 | 0.174 | 1.782 |
| 540 | 0.134 | 0.052 | 0.186 | 2.593 |
| 550 | 0.159 | 0.042 | 0.201 | 3.782 |
| 560 | 0.185 | 0.033 | 0.219 | 5.559 |

(Third embodiment)

Figure 16:
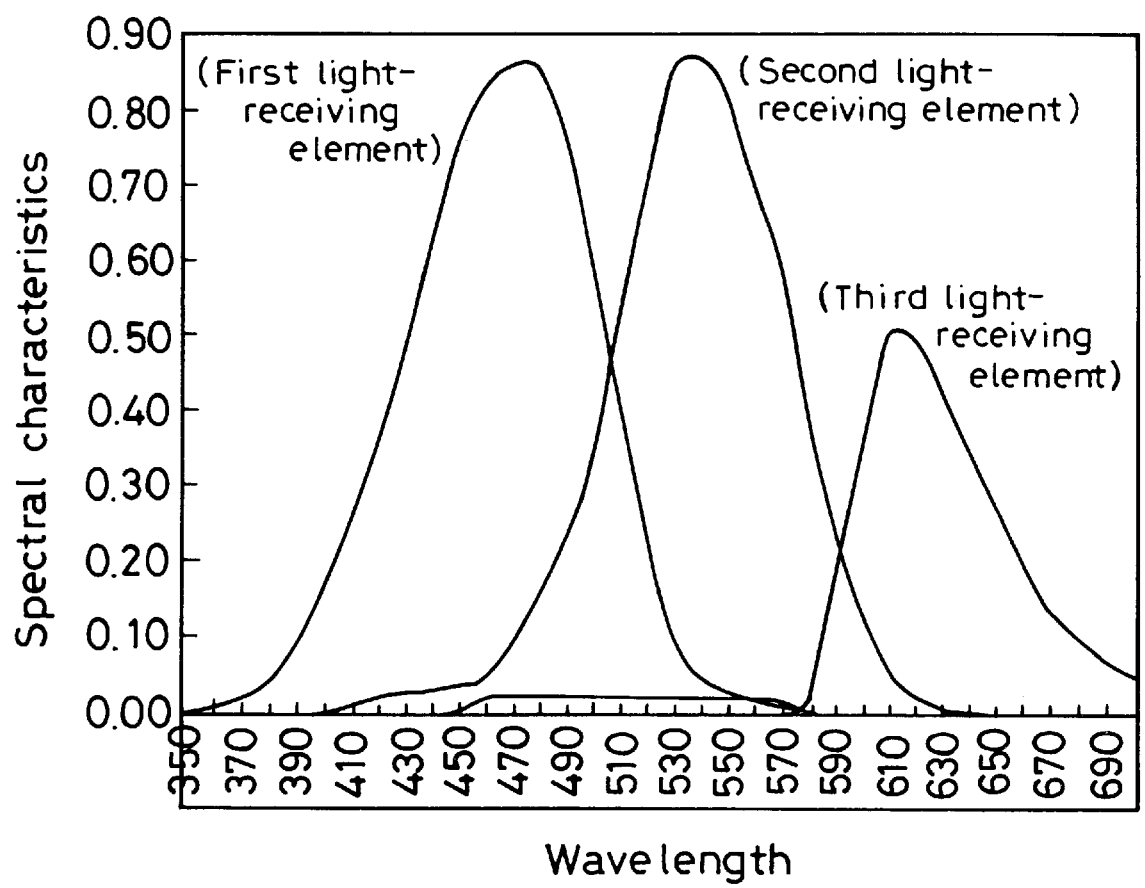
FIG. 16 is a graph showing the spectral characteristics of a CCD in the third embodiment.
Figure 17:
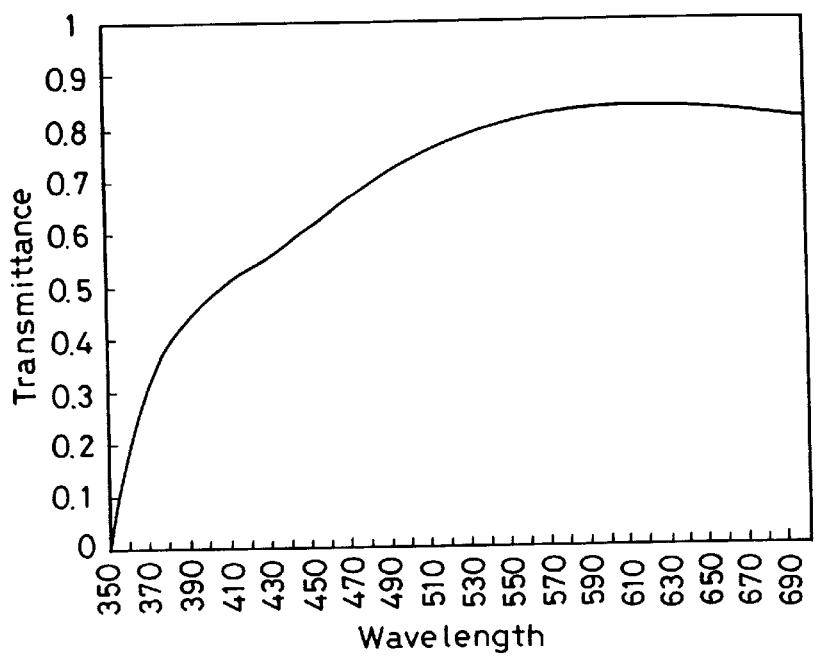
FIG. 17 is a graph showing the spectral transmittance of a lens in the third embodiment.

In the third embodiment, color flare quantities $E_1(\lambda_{DOE})$ and $E_3(\lambda_{DOE})$ are calculated in the design wavelength range of 440 to 600 nanometers of the DOE under the conditions that the spectral characteristics of the light source are those of a white light source (D5500), as shown in FIG. 9. The spectral characteristics of the Image pick-up device are those of a CCD as shown in FIG. 16. The transmittance of the lens is such as that shown in FIG. 17. Regarding the diffraction efficiency of the DOE, the design order m of diffraction is 1, and the optical member forming the diffraction surface is an acrylic resin material. It should be noted that the integration calculation of $E_1(\lambda_{DOE})$ and $E_3(\lambda_{DOE})$ in the conditional expressions is performed by summing, $\Sigma$, spectral characteristic values every 10 nanometers. The calculation is performed in the range of 350 nanometers to 700 nanometers.

Figure 19:
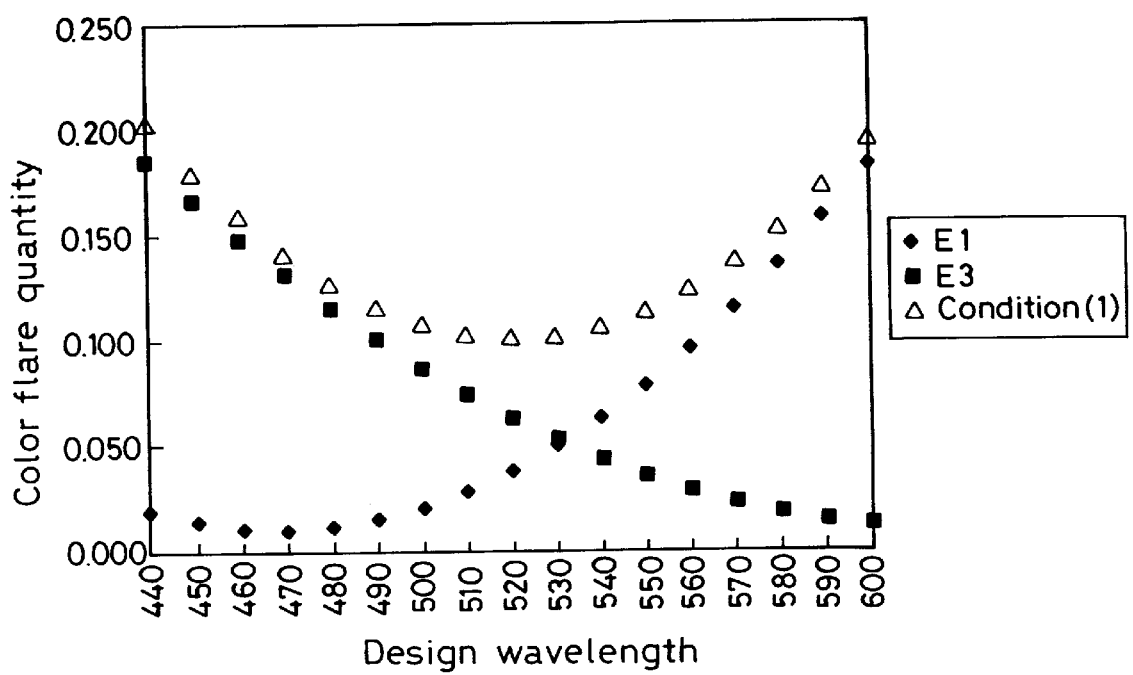
FIG. 19 is a graph showing the relationship between the design wavelength and the amount of color flare caused by unwanted-order light in the third embodiment.

It will be understood from FIG. 19, which shows the results of the calculation, that the design wavelength that satisfies the condition (1) is in the range of about 440 nanometers to about 600 nanometers. Further, it will be understood from the table below, which shows the calculated results, that the design wavelength that satisfies the condition (2) is in the range of about 500 nanometers to about 550 nanometers.

EXAMPLE 3

| $\lambda_{DOE}$ | $E_1$ | $E_3$ | Condition (1) | Condition (2) |
|---|---|---|---|---|
| 440 | 0.019 | 0.185 | 0.204 | 0.101 |
| 450 | 0.014 | 0.166 | 0.180 | 0.082 |
| 460 | 0.011 | 0.148 | 0.159 | 0.073 |
| 470 | 0.010 | 0.131 | 0.141 | 0.077 |
| 480 | 0.011 | 0.116 | 0.127 | 0.099 |
| 490 | 0.015 | 0.101 | 0.116 | 0.148 |
| 500 | 0.020 | 0.087 | 0.108 | 0.235 |
| 510 | 0.028 | 0.074 | 0.103 | 0.377 |
| 520 | 0.038 | 0.063 | 0.101 | 0.598 |
| 530 | 0.049 | 0.053 | 0.102 | 0.936 |
| 540 | 0.063 | 0.043 | 0.106 | 1.447 |
| 550 | 0.078 | 0.035 | 0.114 | 2.217 |
| 560 | 0.096 | 0.028 | 0.124 | 3.373 |
| 570 | 0.115 | 0.023 | 0.137 | 5.097 |
| 580 | 0.136 | 0.018 | 0.153 | 7.605 |
| 590 | 0.158 | 0.014 | 0.172 | 11.077 |
| 600 | 0.182 | 0.012 | 0.194 | 15.358 |

As will be clear from the foregoing description, even if a DOE is used in a photographic lens having a relatively wide working wavelength range, blue or red flare caused by unwanted-order light can be minimized by optimizing the design wavelength, at which the diffraction efficiency is maximized, according to Eq. (1) as in the present invention. Accordingly, high image quality can be obtained.

What we claim is:

1. A photographic optical system comprising at least one diffractive optical element and an image pick-up device, said image pick-up device having at least a first light-receiving element, a second light-receiving element, and a third light-receiving element, which correspond to three respective wavelength regions, a design wavelength $\lambda_{DOE}$ satisfies the following condition:

$$0 < E_1(\lambda_{DOE}) + E_3(\lambda_{DOE}) < 0.2$$

where $E_1(\lambda_{DOE})$ and $E_3(\lambda_{DOE})$ are as follows:

$$E_1(\lambda_{DOE}) = \{\int D_{m-1}(\lambda_{DOE},\lambda)L(\lambda)F_1(\lambda)T(\lambda)d\lambda + \int D_{M+1}(\lambda_{DOE},\lambda)L(\lambda)F_1(\lambda)T(\lambda)d\lambda\} \div \{\int L(\lambda)F_1(\lambda)T(\lambda)d\lambda\}$$

$$E_3(\lambda_{DOE}) = \{\int D_{m-1}(\lambda_{DOE},\lambda)L(\lambda)F_3(\lambda)T(\lambda)d\lambda + \int D_{m+1}(\lambda_{DOE},\lambda)L(\lambda)F_3(\lambda)T(\lambda)d\lambda\} \div \{\int L(\lambda)F_3(\lambda)T(\lambda)d\lambda\}$$

where:

$$\int L(\lambda)F_1(\lambda)T(\lambda)d\lambda = \int L(\lambda)F_2(\lambda)T(\lambda)d\lambda = \int L(\lambda)F_3(\lambda)T(\lambda)d\lambda$$

where:

$D_{m-1}(\lambda_{DOE},\lambda)$, $D_{m+1}(\lambda_{DOE},\lambda)$: diffraction efficiencies for (m−1)th and (m+1)th orders at wavelength $\lambda$ when a design order of diffraction and design wavelength of said diffractive optical element are m and $\lambda_{DOE}$, respectively;

$L(\lambda)$: spectral characteristics at $\lambda$ of a light source;

$F_1(\lambda)$, $F_2(\lambda)$, $F_3(\lambda)$: spectral sensitivity characteristics of light-receiving means provided in image pick-up means to detect light in predetermined wavelength regions, respectively, wherein the spectral sensitivity characteristics are defined as $F_1(\lambda)$, $F_2(\lambda)$ and $F_3(\lambda)$, respectively, in order of increasing wavelength at which spectral sensitivity reaches a maximum, $T(\lambda)$: transmittance at $\lambda$ of said photographic optical system, wherein an amount of color flare in said first light-receiving element is defined as $E_1$, an amount of color flare in said third light-receiving element is defined as $E_3$, and a wavelength at which a diffraction efficiency of said diffractive optical element reaches a maximum is defined as said design wavelength $\lambda_{DOE}$.

2. photographic optical system according to claim 1, wherein the design wavelength $\lambda_{DOE}$ satisfies the following condition:

$$0.20 < E_1(\lambda_{DOE})/E_3(\lambda_{DOE}) < 5.$$

3. A photographic optical system according to claim 1, wherein the design wavelength $\lambda_{DOE}$ satisfies the following condition:

$$1 < E_1(\lambda_{DOE})/E_3(\lambda_{DOE}) < 5.$$

4. A photographic optical system according to claim 1, 2 or 3, wherein a diffraction surface of said diffractive optical element is a kinoform configuration.

5. A photographic optical system according to claim 1, 2 or 3, wherein the design order m of said diffractive optical element is 1.

6. A photographic optical system according to claim 1, 2 or 3, which has a single diffraction surface.

7. A photographic optical system according to claim 1, wherein said image pick-up device is a CCD.

* * * * *